United States Patent [19]

Weiss et al.

[11] Patent Number: 5,008,927

[45] Date of Patent: Apr. 16, 1991

[54] COMPUTER AND TELEPHONE APPARATUS WITH USER FRIENDLY COMPUTER INTERFACE INTEGRITY FEATURES

[75] Inventors: Lawrence D. Weiss, New York, N.Y.; Douglas W. Caruthers, Redondo Beach, Calif.; Charles T. Inatomi, Los Angeles, Calif.; Joseph C. Kawan, Hollywood, Calif.; Shan Lee, Rowland Heights, Calif.; Harvey Marks, Canoga Park, Calif.; Sarkis A. Meguerdijan, Glendale, Calif.; Dilip J. Parekh, Los Angeles, Calif.; Alfred S. Samulon, Malibu, Calif.; Melvin M. Takata, Hermosa Beach, Calif.; Morris L. Tucci, Van Nuys, Calif.; Jim R. Vollmer, Encino, Calif.

[73] Assignee: Transaction Technology, Inc., Santa Monica, Calif.

[21] Appl. No.: 260,832

[22] Filed: Oct. 21, 1988

Related U.S. Application Data

[63] Continuation-in-part of Ser. No. 190,440, May 5, 1988.

[51] Int. Cl.[5] .......................................... H04M 11/00
[52] U.S. Cl. ................................... 379/98; 364/900; 364/975.2; 364/941.5; 364/928.5; 364/918.2; 379/96; 379/97
[58] Field of Search ................... 379/110, 96, 97, 98; 364/200 MS File, 900 MS File, 110

[56] References Cited

U.S. PATENT DOCUMENTS

| | | | |
|---|---|---|---|
| 3,760,375 | 9/1973 | Irwin et al. | 362/200 |
| 3,865,994 | 2/1975 | Bender | 379/110 |
| 3,932,709 | 1/1976 | Hoff et al. | 379/96 |
| 3,987,259 | 10/1976 | Larson | 200/5 A |
| 3,995,123 | 11/1976 | Wilson | 379/110 |
| 4,291,198 | 9/1981 | Anderson et al. | 364/900 |
| 4,291,199 | 9/1981 | Densmore et al. | 379/157 |
| 4,301,337 | 11/1981 | Eventoff | 200/5 A |

(List continued on next page.)

FOREIGN PATENT DOCUMENTS

| | | |
|---|---|---|
| 0085482 | 10/1987 | European Pat. Off. . |
| 2632106 | 1/1978 | Fed. Rep. of Germany . |
| 2709461 | 9/1978 | Fed. Rep. of Germany . |
| 3212554 | 10/1983 | Fed. Rep. of Germany ........ 379/96 |
| WO87/10256 | 2/1987 | PCT Int'l Appl. . |
| 1528691 | 2/1978 | United Kingdom . |
| 2128447 | 4/1984 | United Kingdom . |
| 2149946 | 6/1985 | United Kingdom . |

OTHER PUBLICATIONS

IBM Technical Disclosure Bulletin, vol. 23, No. 9, Feb. 1981 (Intelligent Telephone).
Japanese Publication vol. 6, No. 112 (P-124( (990), Jun. 23, 1982, "Reset Preventing System of Microprocessor".
Japanese Publication vol. 3, No. 36 (P-103) Mar. 27, 1978, "Electronic Apparatus".
Special Section: The Telephone Becomes an Information Terminal, May 1987, Computopia, p. 41.
*International Conference on Communications*, Jun. 8-12, 1980, pp. 11.5.1-11.5.4.
Display Phone: Telephone and Terminal Combine in a Compact Desk-Top Unit, by Adkins et al., *Telesis* (Bell-Northern Research) 1982, pp. 2-7.

*Primary Examiner*—Lawrence E. Anderson
*Attorney, Agent, or Firm*—Pennie & Edmonds

[57] ABSTRACT

The present invention relates to a programmable microcomputer or microprocessor device with associated memory and telephone circuitry designed to be operated in most circumstances through a standard telephone 12-key keypad input. The microcomputer device of the present invention, which includes the primary microprocessor operated in conjunction with other computer elements, including memory, has the overall appearance of a telephone. The primary microprocessor of the invention consists of a central processing unit and associated memory and includes enhanced integrity features. The device delivers data processing capabilities and services through an ordinary telephone instrument.

4 Claims, 13 Drawing Sheets

U.S. PATENT DOCUMENTS

| | | | |
|---|---|---|---|
| 4,313,176 | 1/1982 | Cecil | 379/96 |
| 4,334,126 | 6/1982 | Slingsby | 364/900 |
| 4,409,450 | 10/1983 | Blades | 200/159 A |
| 4,423,294 | 12/1983 | Walser et al. | 200/5 A |
| 4,431,870 | 2/1984 | May et al. | 379/357 |
| 4,468,529 | 8/1984 | Samuel et al. | |
| 4,476,349 | 10/1984 | Cottrell et al. | 379/214 |
| 4,503,288 | 3/1985 | Kessler | 379/96 |
| 4,510,351 | 4/1985 | Costello et al. | 379/34 |
| 4,532,378 | 7/1985 | Nakayama | 379/110 |
| 4,533,791 | 8/1985 | Read et al. | 379/96 |
| 4,578,174 | 3/1986 | Kato et al. | 304/429 |
| 4,578,537 | 3/1986 | Faggin et al. | 379/93 |
| 4,585,908 | 4/1986 | Smith | 379/96 |
| 4,629,832 | 12/1986 | Carson et al. | 340/825.07 |
| 4,639,917 | 1/1987 | Furuta | 371/16 |
| 4,652,704 | 3/1987 | Franklin | 200/5 |
| 4,653,086 | 3/1987 | Laube | 379/96 |
| 4,659,876 | 4/1987 | Sullivan et al. | 379/96 |
| 4,659,879 | 4/1987 | Hasegawa | 200/5 A |
| 4,674,115 | 6/1987 | Kaleita et al. | 379/201 |
| 4,683,360 | 7/1987 | Maser | 200/314 |
| 4,737,980 | 4/1988 | Curtin et al. | 379/96 |
| 4,744,103 | 5/1988 | Dahlquist et al. | 379/263 |
| 4,748,656 | 5/1988 | Gibbs et al. | 399/93 |
| 4,860,342 | 8/1989 | Danner | 379/96 |
| 4,885,765 | 12/1989 | Shirakawa | 379/96 |

COMPUTER AND TELEPHONE APPARATUS WITH USER FRIENDLY COMPUTER INTERFACE INTEGRITY FEATURES

CROSS-REFERENCE TO RELATED APPLICATION

This is a continuation-in-part application of application Ser. No. 07/190,440, filed May 5, 1988.

BACKGROUND OF THE INVENTION

FIELD OF INVENTION

The present invention relates to a programmable microcomputer or microprocessor device with associated memory designed to be operated, in most circumstances, through a standard telephone 12-key keypad input. In an alternative embodiment, the 12-key keypad input device may be augmented by one or more programmable function keys. The microcomputer device of the present invention, which includes the primary microprocessor operated in conjunction with other computer elements, including memory, has the overall appearance of a telephone. The primary microprocessor of the invention consists of a central processing unit and associated memory and includes enhanced integrity features.

The microcomputer device also includes standard telephone apparatus which may be operated either separately or in conjunction with the primary microprocessor. The telephone elements of the device are operated from a conventional 12-key telephone keypad through the telephone electronics of the device and perform normal telephone functions. The telephone electronics may also provide inputs through a keyboard microprocessor to the central processing unit of the primary microprocessor and its extensive memory. An additional 52-key keyboard in the QWERTY format, normally hidden in the telephone housing, provides additional inputs to the central processing unit of the primary microprocessor through the telephone electronics. Inputs to the primary microprocessor may, in the alternative embodiment, be provided by a programmable function key.

The primary microprocessor in conjunction with a multipurpose graphics display controller provides an output to a small cathode-ray tube display device mounted in the housing of the device for viewing by the operator. The primary microprocessor is also connected to a modem which permits the transfer of data from the primary microprocessor over the telephone line.

The 12-key telephone keypad includes a split-pill output feature which provides isolated electrical signal outputs both to the primary microprocessor and to the telephone line through a telephone dialer. The primary microprocessor has the capability of deactivating, under various conditions, the output of the telephone dialer to the telephone line so that data input by the user over the 12-key keypad does not interfere with standard telephone operations. One key on the 12-key keypad, usually the # key, acts a services key and may be designated a HELLO key. Activation of this services or HELLO key, when the telephone is on-hook, changes the primary microprocessor's control over the telephone from a monitoring mode to a controlling mode. The services or HELLO key feature provides computer enhanced telephone operation when the telephone is not connected to the network. The application on the primary microprocessor, in response to the services or HELLO key, typically provides a menu of microprocessor services, eliminates power to the telephone dialer (preventing unwanted dial tones from being transmitted to the network) and provides for transition of the telephone network to computer control.

To operate the device as a telephone, the operator lifts the handset and the device immediately functions as a telephone. In an alternative embodiment, a function key may be used in place of the HELLO key to obtain microprocessor control over the telephone.

The invention's support circuitry provides a number of integrity features. These include the following error detection or failure prevention features: (1) a determination as to whether the microprocessor software is functioning properly when the telephone is taken off-hook, (2) a watchdog timer to ensure that the computer software is not malfunctioning, (3) a parity check for the microprocessor's 512K byte volatile random access memory (RAM), (4) battery power for the microprocessor's 192K byte non-volatile RAM, (5) circuitry to provide write protection for that memory, (6) power failure detection which interrupts the microprocessor when certain voltage thresholds are crossed, (7) battery low warning and (8) independent operation of the telephone electronics from the telephone line power so that when the A/C power fails, the telephone will continue to operate.

The integrity features provide the following protections. The telephone hardware will force the telephone electronics into a manual mode when an off-hook sensor/timer senses a malfunction. A malfunction indication will appear as a service light on the telephone console. The device includes its own diagnostic elements which provide a power-on self test. An independent power failure detection element provides an indication to the primary microprocessor that it is not properly powered. Detection of power failure provides an indication to the microprocessor software that certain power limits have been crossed, permits the software to clean up and disconnect the primary microprocessor when such limits are exceeded, and permits continued use of the standard telephone features of the device. The power failure detection feature of the microprocessor provide adequate thresholds to ensure the microprocessor will run without problems through brown out conditions.

The device of this invention includes a separate microprocessor to organize keyboard inputs to the primary microprocessor. The keyboard processing unit organizes real time data to the primary microprocessor presented by either keypad, keyboard or related elements of the telephone electronics. The keyboard processing unit also includes tone detecting hardware and software which can distinguish (1) busy or fast busy, (2) call-waiting, (3) ringing and (4) dial tone and passes this information to the primary microprocessor. The primary processor and keyboard processing unit have an established protocol to increase the integrity of the overall system. If the primary processor fails to hear from the keyboard processing unit at least once every five seconds, the system will reset causing both processors to reinitialize.

BACKGROUND ART

It is well-known in the art that microprocessors can be used for telecommunications applications as shown by Subhash Bal, "New Generation Microprocessor for Telecommunication Applications." *Proceedings 1980-International Conference on Communications,* Seattle, Wash., (June 8-12, 1980) pages 11.5.1-11.5.4. Additionally, microprocessors have been used as control apparatus for a number of communication system administration functions and in switching systems as shown in U.S. Pat. No. 4,580,011 to Robert E. Glazer, issued Apr. 1, 1986 and U.S. Pat. No. 4,629,832 to Robert A. Carson et al, issued Dec. 6, 1986. It is known that, to increase system integrity, the administration functions in a telephone network can be controlled by a microprocessor to facilitate the interaction of a private branch exchange or similar telephone network with a telephone central office. It is also known that telephone protection functions can be performed through a microprocessor. Operation of computers with simple interfaces and the connection of several computers to a host computer in a network through modems is also known in the prior art. However, the prior art does not teach the use of a microprocessor controlled primarily through a 12-key keypad of a normal telephone device where the keypad also operates a stand-alone telephone unit and additionally provides user interface to the microprocessor.

SUMMARY OF INVENTION

The microcomputer with simplified user interface of the present invention is incorporated in a small desk-top housing which has the general appearance of a standard desk telephone. The present microcomputer invention includes three basic components which cooperate together to provide improved telephone and computing functionality. These basic components include (1) a primary microprocessor consisting of a central processing unit (CPU), memory elements associated with the CPU and certain hardware integrity features protecting the CPU, (2) telephone electronics consisting of (i) a manual telephone circuit including a dialer, speech network and ring detector powered by the telephone line voltage, (ii) a keyboard/keypad microprocessor receiving input from a telephone keypad and a keyboard input device and associated hardware to provide an interface between the telephone operation of the device and the primary microprocessor and (3) a modem for data transfer to and from the primary microprocessor over the telephone line.

The telephone electronics has several unique features which simplify the primary microprocessor's user interface. The keyboard/keypad microprocessor receives input signals from a normal 12-key keypad used on a standard touch-tone telephone unit and an additional 52-key keyboard in a QWERTY format. In an alternative embodiment, the 12-key keypad may be augmented by one or more function keys. The 12-key keypad is positioned on the unit as it would be on a normal telephone. The 52-key keyboard is normally hidden in the housing and may be used when more complex inputs to the primary microprocessor are required.

The telephone 12-key keypad provides a dual output. One output is directed to the primary microprocessor through the keyboard/keypad processor. The other output is directed to the telephone dialer. The dual output is achieved through a split-pill output device incorporated in the keypad unit. The term "split-pill," refers to the physical construction of the output element. Two output signals are created each time a keypad is depressed by the operator through two semi-circle metal pieces which contact separate exposed traces mounted below the pieces to complete a circuit to provide the signal outputs. The metal pieces and traces are mounted in a membrane structure which urges them apart unless a keypad is depressed. Thus, unless the dialer is deactivated, the telephone keypad provides both an input to the keyboard/keypad microprocessor and a tone on the telephone line. The telephone dialer may be pulse or tone as selected by the user. The user setting can be overridden by the primary microprocessor. The telephone dialer may be disconnected from the telephone line by a disable function of the dialer so that the telephone keypad only provides input to the microprocessor.

The telephone electronics includes an off-hook timer which, when armed, senses the removal of the handset from the telephone. The function of the off-hook timer is to ensure that the primary microprocessor software is functioning properly each time the telephone is taken off-hook. The off-hook timer is halted by the primary microprocessor through an output to the timer within a fixed interval after the telephone is taken off-hook. If the timer expires without being halted, the telephone features of the device are placed in the manual mode (i.e. the telephone continues to operate as a normal telephone) and the microprocessor is reset. The telephone electronics includes a standard telephone speech network so that the device may be used as a standard telephone voice transmission unit.

One key on the 12-key keypad is designated a service or HELLO key. Activation of the HELLO key causes the application to (1) provide a menu of the computer's various functions on the CRT display and (2) deactivate the telephone dialer so that, thereafter, the telephone keypad only provides input to the primary microprocessor through the keyboard/keypad microprocessor. The invention's circuitry provides the capability to detect whether another extension is off-hook and make this information available to the software. In an alternative embodiment, one or more function keys may be mounted on the housing case of the invention adjacent to the 12-key keypad. Any function key or selected keys of the 12-key keypad can be programmed through the primary microprocessor for specific functions selected by the manufacturer. In one embodiment, function keys for speed dial and re-dial may be provided. The device may include a flash key which performs its standard function in a telephone device. The selected keys of the 12-key keypad may be programmed for these functions. Also positioned in the housing is a small flat cathode-ray tube (CRT) display which displays information from the microprocessor.

The invention's circuitry includes a number of integrity features. These include (1) a watchdog timer, (2) an off-hook timer, (3) a parity check for the 512K byte volatile RAM, (4) circuitry to provide write protection for the battery backed memory, (5) battery back-up for the 192K byte non-volatile RAM, (6) power fail detection, (7) battery low warning and (8) telephone operation with no A-C power.

The watchdog timer is reset through the primary microprocessor's Input/Output bus. If the primary microprocessor allows the watchdog timer to expire and does not reset it, a non-maskable interrupt is generated as an input to the primary microprocessor. If the timer is allowed to expire a second consecutive time, a hardware reset is generated which disables the timer, decouples the telephone electronics from the primary microprocessor, reboots the primary microprocessor and activates a service light on the housing.

The microprocessor circuitry provides a parity check for the 512K byte non-battery-backed-up RAM memory. Power failure detection is also provided. The microprocessor's power failure detection circuit is responsive to certain interruptions in power to the microprocessor or low power conditions and notifies the microprocessor software after receipt of the warning detections when certain thresholds are crossed. In response to these warnings, the primary microprocessor places itself in a condition for minimum disruption if power failure occurs.

The primary microprocessor includes the following memory elements: a 512K byte volatile RAM memory, a 192K byte battery-backed-up non-volatile RAM memory protected for a specified period, and a 256K byte non-volatile non-writable read only memory for the performance of certain specified microprocessor functions. The volatile RAM memory is intended for holding microprocessor program information and other data. The battery backed non-volatile writable memory holds elements of the microprocessor program, important user information and microprocessor configuration data. The non-writable memory includes an interpreter for the program used with the microprocessor, certain elements for the program's telephone interface features and the required software for start-up of the program. The primary microprocessor memory may also include an additional 32K byte long-term (i.e. 10 years) non-volatile random access memory for storage of user information, such as telephone numbers and addresses. The housing and the primary microprocessor's physical configuration may be modified so that such long-term memory could be located on a credit card sized removable card. Then, the user could transfer the data from one device to the other.

The primary microprocessor itself is connected to the telephone line through a modem and, thus, is capable of dialing and communicating with other parts of a computer network. The primary microprocessor may be programmed to incorporate dedicated software functions including a record manager for reading and writing data, such as records, into the primary microprocessor memory, a telephone list, activity log, a user configuration record and a diagnostic log. The logs may be sent to another computer via telephone line for further processing. The primary microprocessor includes certain software diagnostics which control the microprocessor's status and provides for overall microprocessor protection.

It is an object of this invention to provide a device with the features of a computer, housed in a unit which appears to the user to be no more complex than an ordinary telephone. It is an object of this invention to provide a user friendly microprocessor controlled for most operations through the 12-element keypad of a normal telephone. It is an object of this invention to provide a highly capable computer usable as a telephone and also responsive to the user's commands made through the keypad. It is another object of this invention to provide a microprocessor with enhanced integrity features allowing for an improved interaction with telephone electronics and other input devices. Other features of the present invention will become clear after a review of the detailed description below taken in conjunction with the attached drawings.

DESCRIPTION OF THE STRUCTURE OF THE PREFERRED EMBODIMENT

Figure 1:
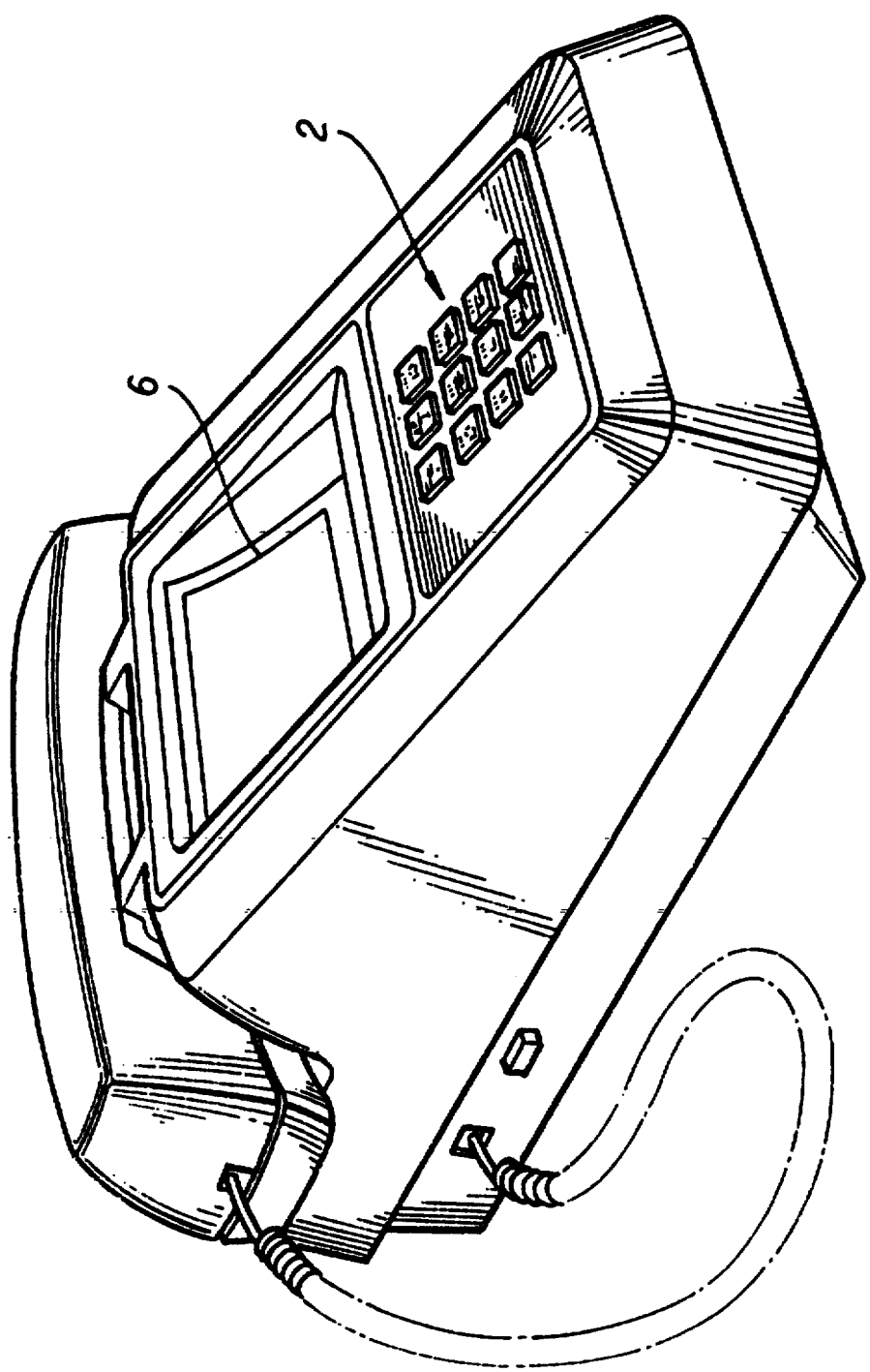
FIG. 1 is a front perspective of the housing for the invention.
Figure 2:
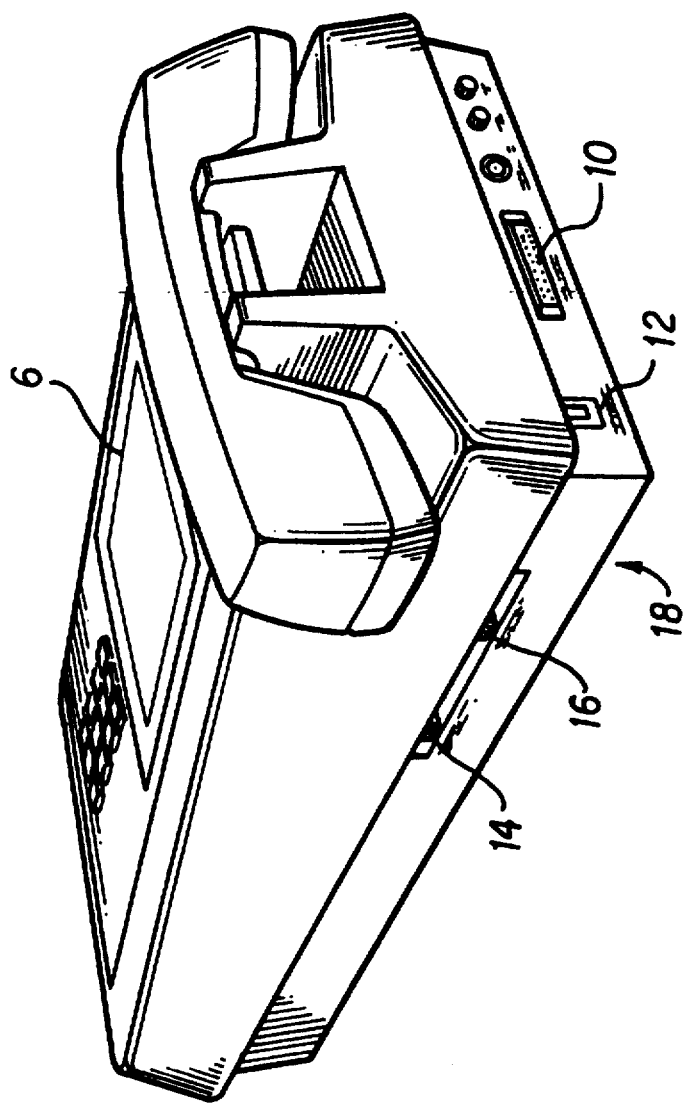
FIG. 2 is a rear perspective view of the housing for the invention.
Figure 4:
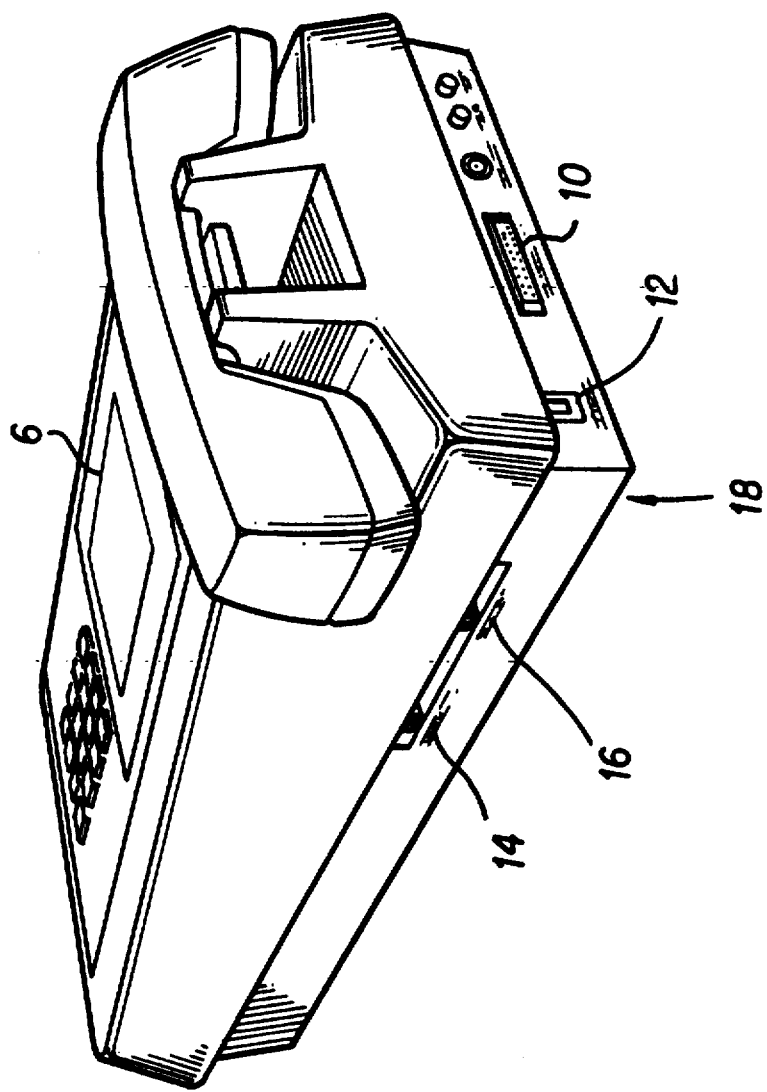
Figure 6:
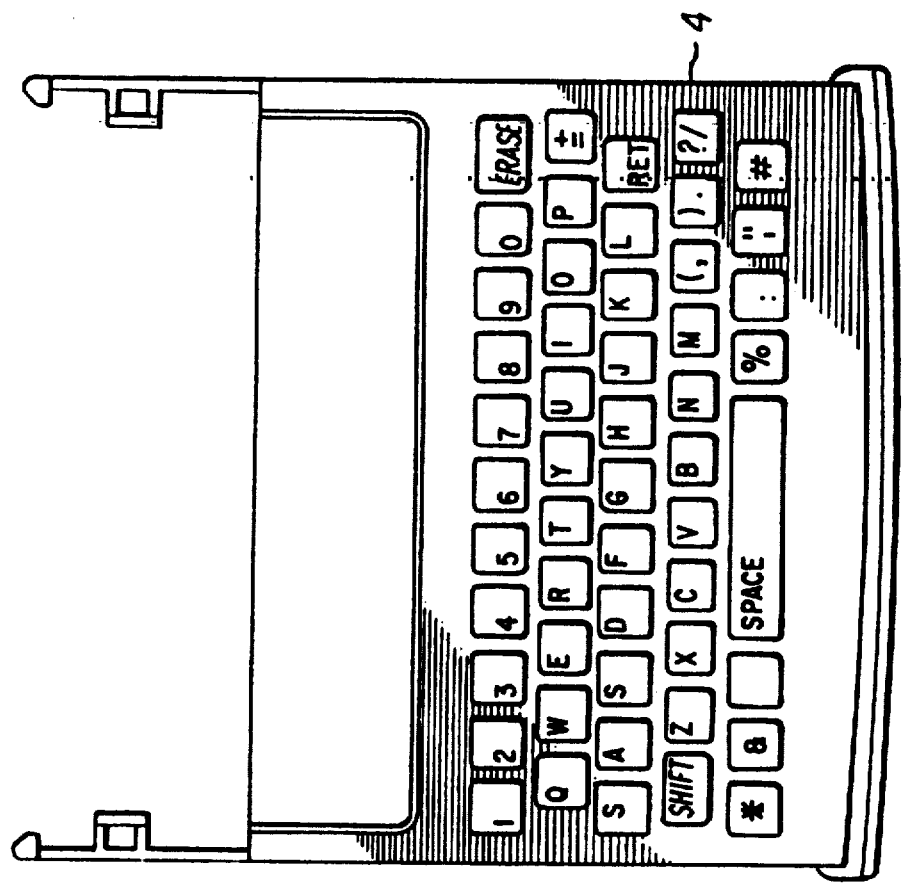
FIGS. 5 and 6 are a side and plan view of the access drawer for the 52-key keyboard.
Figure 5:
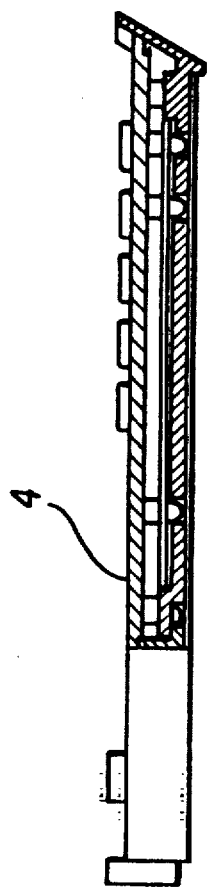

With reference to the drawings, wherein like numerals refer to like parts in the several views, in FIGS. 1 and 2, the microprocessor/telephone device of the present invention has the overall appearance of a conventional desk-top telephone unit. The present microprocessor/telephone invention is incorporated in a telephone housing so that it presents to a technically unskilled operator a format with which he or she is familiar, i.e. a conventional telephone. The microcomputer device of the present invention may be incorporated in a wall telephone or any other conventional telephone format. The invention is designed to operate both as a standard telephone unit and as a microcomputer in a computer network. The microcomputer of the present invention which is a primary microprocessor and associated memory is designed to have a simplified user interface. The interface is operated through the telephone unit using the 12-key keypad 2 of the telephone. One key of the 12-key keypad 2 is designated a HELLO key and activates the primary microprocessor control of the telephone as explained above. The telephone keypad 2 activates either tone or pulse dialing functions for the electronics of the telephone incorporated in the device and also provides input through a keyboard-/keypad microprocessor to the primary microprocessor element of the invention. The primary microprocessor may also receive input through the keyboard/keypad microprocessor from a 52-key keyboard 4, shown in FIGS. 5, 6 and 7. This board has a QWERTY format and is normally hidden from view. The user interface also includes a 4-inch SONY Watchman ® white-phosphor cathode-ray tube (CRT) display 6 which receives its input directly from the microprocessor via a multipurpose graphics display controller. Other displays such as a liquid crystal display (LCD) are compatible with the microprocessor and controller and may be used instead of the CRT with some packaging modifications. Referring to FIGS. 2 and 4, the housing for the invention further includes controls for the display, an accessories port 10 (to support printing or initial speed loading of the RAM), a connection to a telephone line 12 and controls for the telephone speaker 14, ringer 16 and dialer 18, where said control of dialer 18 is used for the selection of pulse or tone, and is located on the bottom of the microprocessor/telephone device.

Figure 3:
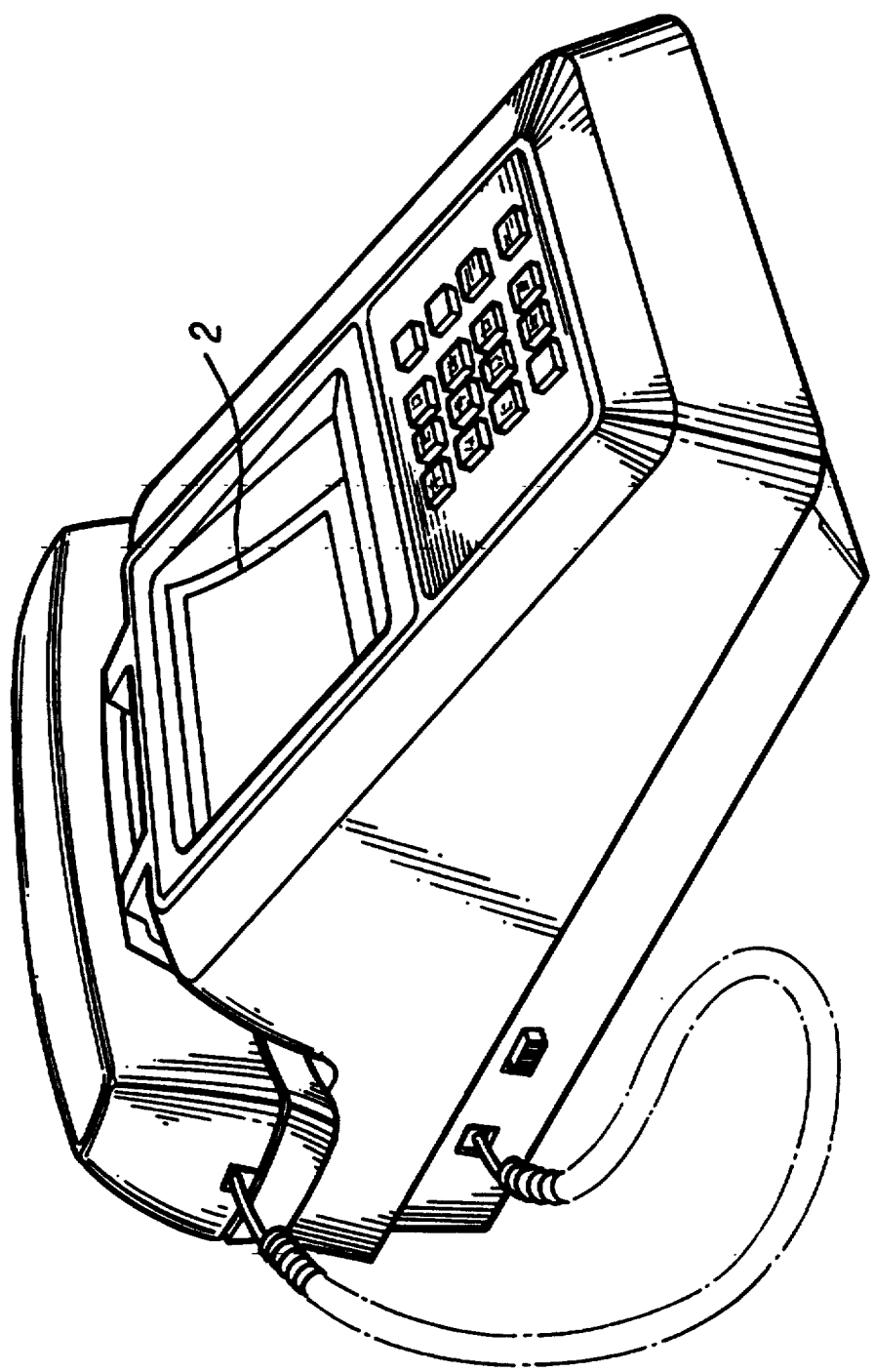
FIGS. 3 and 4 are front and rear perspective views of an alternative embodiment of the invention including function keys.

FIGS. 3 and 4 disclose an alternative embodiment of the invention in which the 12-key keypad is augmented by four function keys. In this alternative, one key is a service key which performs the functions of the HELLO key in the preferred embodiment. The other function keys are programmable and may perform the standard functions of speed dial, flash or redial.

Figure 7:
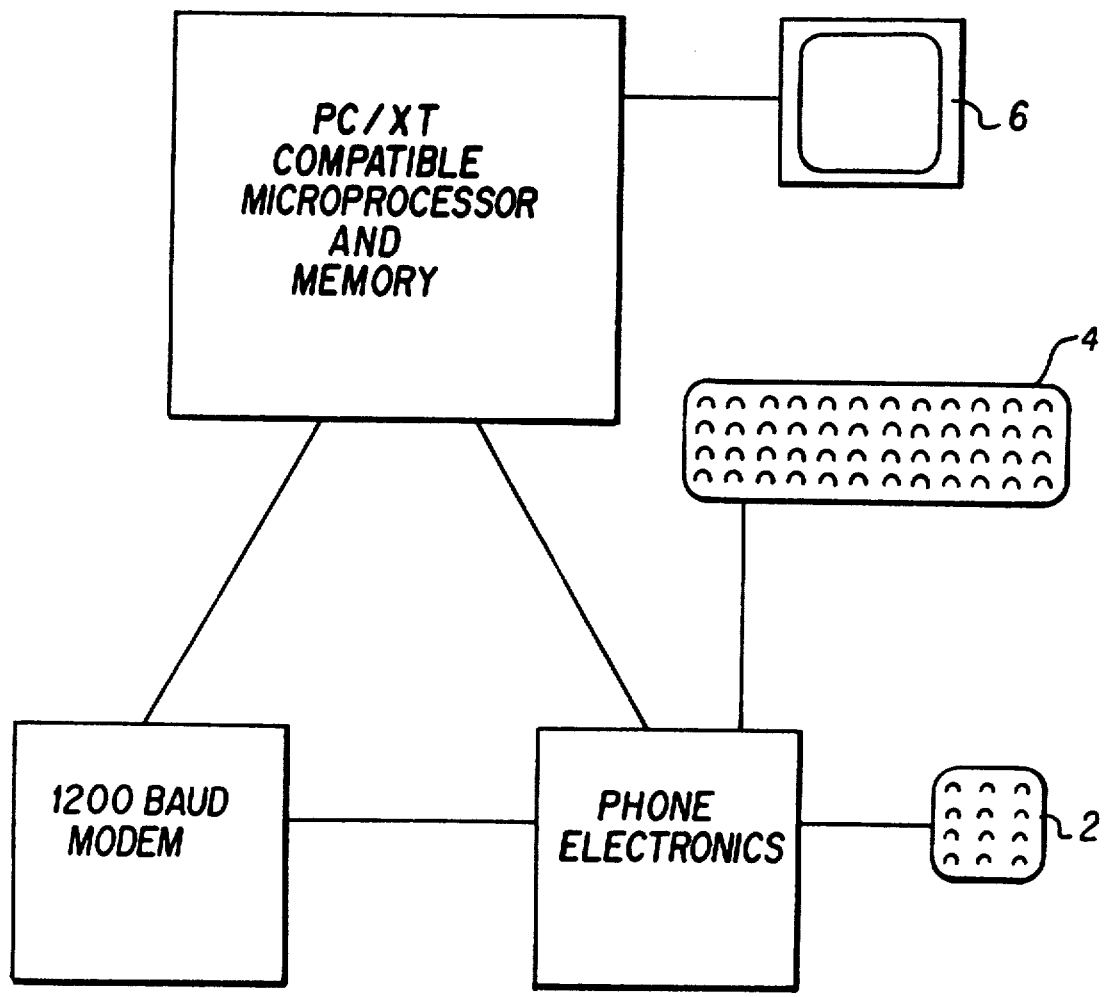
FIG. 7 is a depiction in a block diagram format of the functional components of the microprocessor/telephone system of the invention.

FIG. 7 depicts the basic structure of the hardware of the microprocessor/telephone unit. As stated above, the device of the invention includes three basic elements (1) telephone electronics, (2) a primary microprocessor with memory and (3) a modem. The telephone electronics provides input to the primary microprocessor of the invention and also acts as a telephone. The primary microprocessor itself includes an 8086 compatible central processing unit and is compatible with the standard International Business Machine (IBM) PC/XT at the BIOS level. The microprocessor includes six-memory units, a volatile writable 512K byte RAM memory, a non-volatile writable 192K byte RAM memory with battery backup, a 256K byte non-volatile non-writable ROM memory, an 8K byte character generator ROM memory and a 16K byte display memory for interface with the 4-inch SONY Watchman ® white-phosphor CRT display. The display is controlled by a multipurpose graphics display controller which can provide black and white or color CRT or drive an LCD display panel. The primary microprocessor memory may include a 32K byte electrically erasable programmable read-only memory (EEPROM) or a static RAM memory with ten-year built-in battery protection for recording user information such as telephone numbers and addresses.

The primary microprocessor is a general purpose computer and may be programmed in any standard manner. The primary microprocessor can be programmed to include certain fixed functions as will be explained in detail below. One application program usable on the primary microprocessor is implemented using a software language designated Home Access Language (HAL). The application program is formatted in logic pages. A page includes screens to be displayed on the CRT and logic associated with specific operations described on the screens. The application program written in HAL is compiled into pseudo-code on a mainframe computer and is translated into an executable format by a HAL interpreter incorporated in the 256K byte ROM. The application program, when incorporated in the primary microprocessor, permits it to receive input from the keyboard microprocessor and the modem and to perform certain programmed functions as explained below. The primary microprocessor is connected to a 1200 Baud or higher rate modem. The modem is also connected to the telephone line and provides an interface between the microprocessor and other elements of the computer network in which the microprocessor is used.

Figure 8:
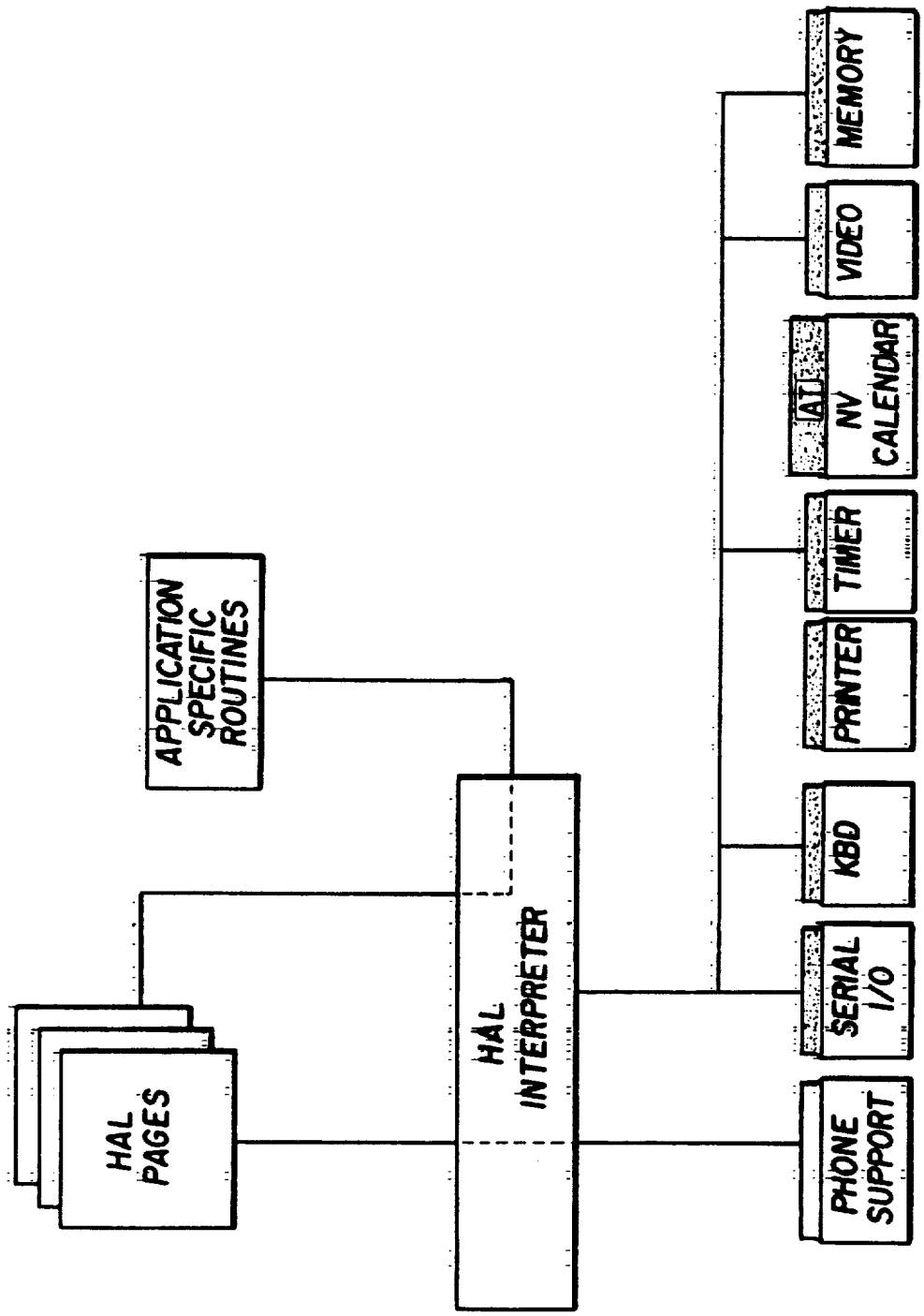
FIG. 8 is a depiction of the structure and functioning of the software of the primary microprocessor used in the invention.

FIG. 8 sets forth an overview of certain software functions when the primary microprocessor is programmed in the HAL format. The primary microprocessor receives certain standard software applications after compilation into the HAL pseudo-code. These applications are interpreted by a HAL interpreter located in the 256K ROM. The initial HAL application pages, certain specific routines, customer data and/or configuration data are written into the battery-backed memory so that they are protected against power failure. In the alternative, all such data except customer data may be placed in the ROM.

Figure 9:
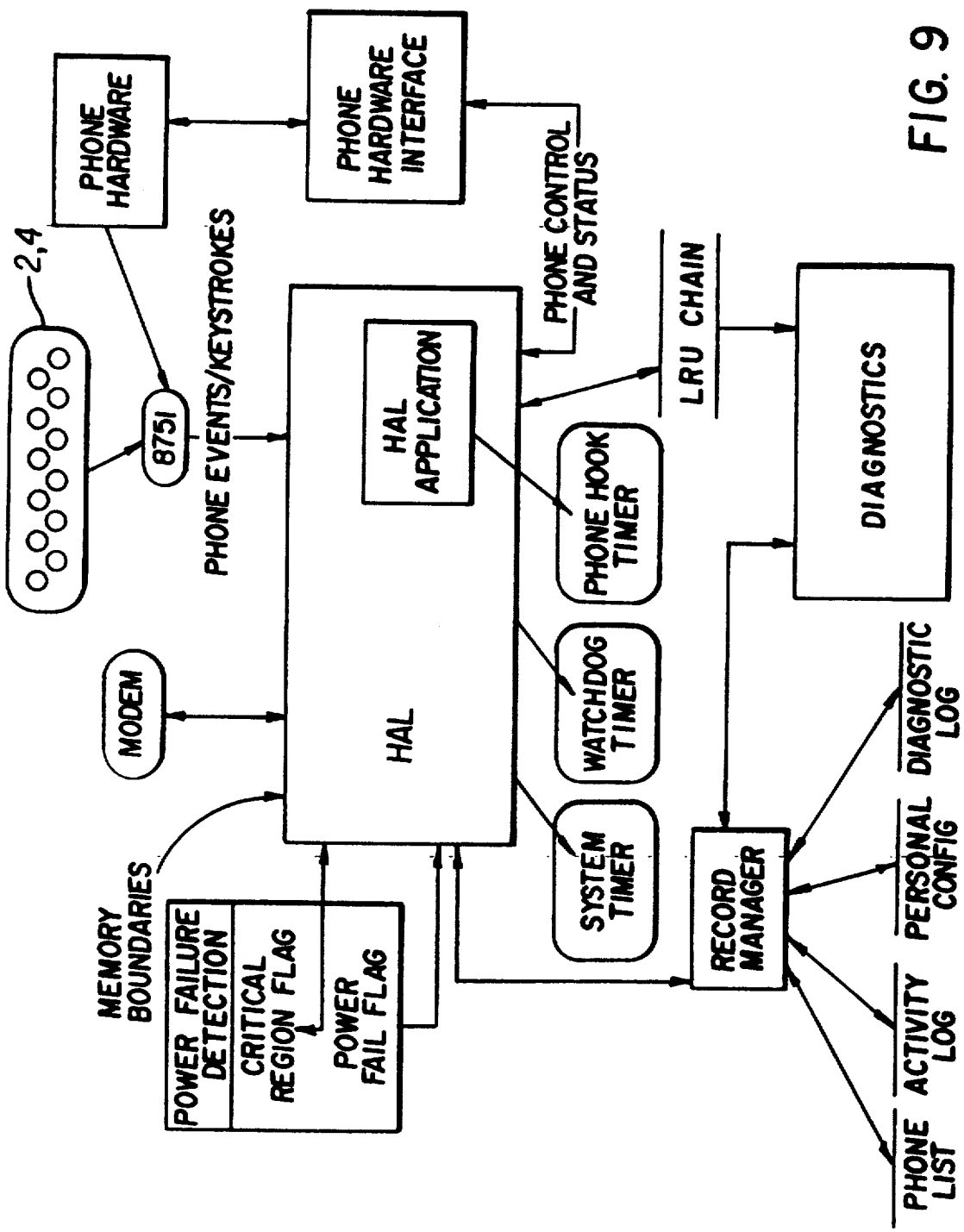
FIG. 9 is a depiction of the structure and functioning of the software of the primary microprocessor used in the invention, showing system configuration parameters.

FIG. 9 depicts the microprocessor's software interface with the telephone as provided by the HAL applications. These functions include control and status reporting of the telephone electronics, control of the telephone off-hook timer, control of a watchdog timer and system timer. These functions will be explained in greater detail below. The applications also provide input to microprocessor diagnostics and create a power-on self test for the microprocessor. In one embodiment of the invention, the program invokes a record manager which manages a telephone list data record, activity logs, a personal configuration module and diagnostic log. Certain elements of these records are maintained in the writable battery-backed memory to provide protection against power failure.

The program interacts with the primary microprocessor circuitry to provide a power failure protection feature. Power to the primary microprocessor below a predetermined level is detected by the microprocessor circuitry and provides an interrupt to the microprocessor. The so-called "power fail" interrupt causes the microprocessor to reset and to condition itself for possible failure. The telephone electronics is also disconnected from the microprocessor so that the telephone may continue operation without the microprocessor, using telephone line power. The primary microprocessor programs define certain microprocessor configuration parameters including the boundaries of the memory for the application pages as well as the data memory areas. The system software also provides that data pages may be written in the volatile memory. When the memory is filled and the primary microprocessor needs an additional page, the primary microprocessor transfers the new page from a network data bank and overwrites the pages which are least recently used. These overwritten pages may be retrieved from the network memory through the modem, if required again.

Figure 10:
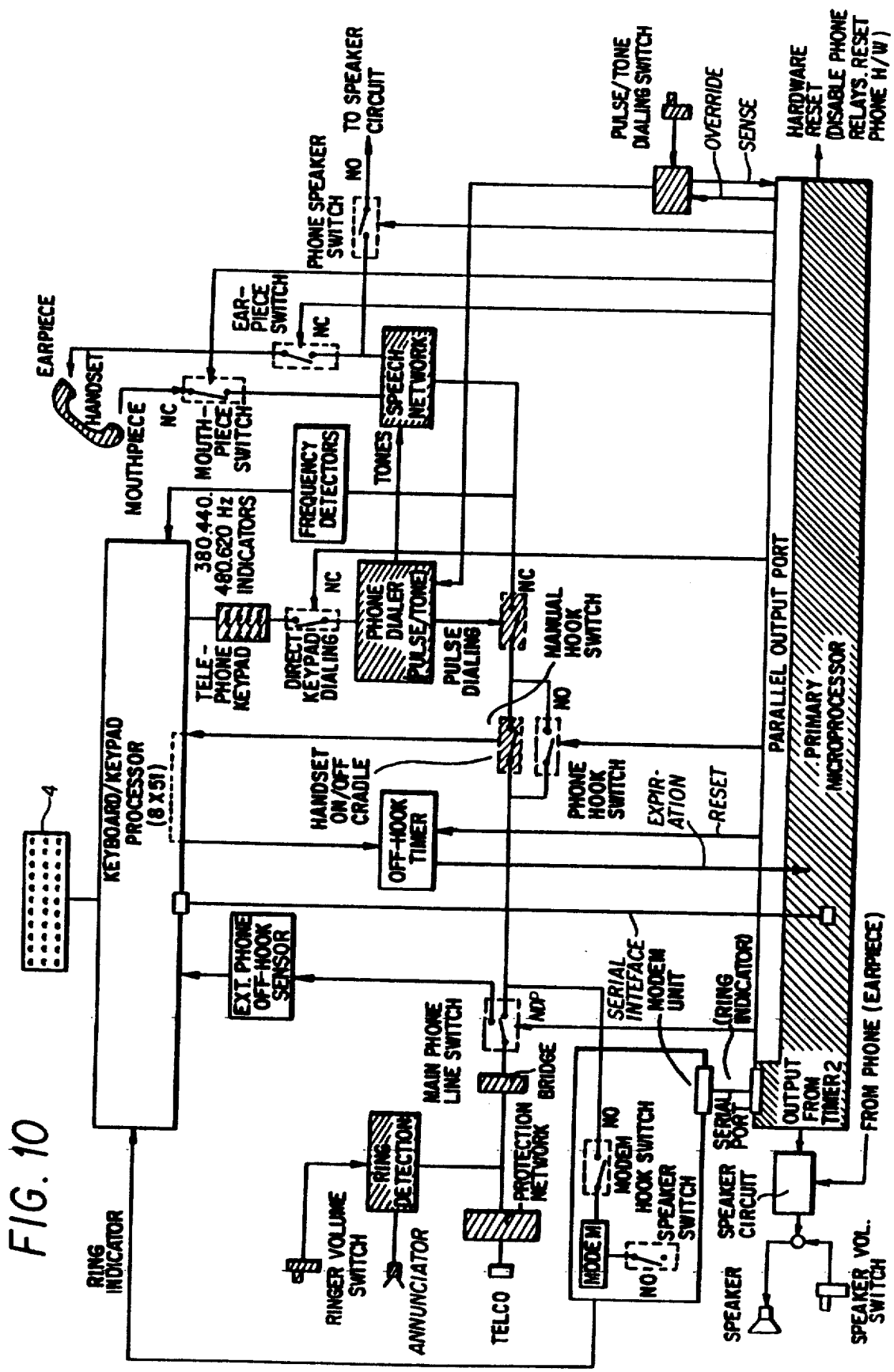
FIG. 10 is a functional diagram of the telephone electronics and related communications features of the telephone device of the present invention.

FIG. 10 is a block diagram of the telephone electronics of the invention. Shaded areas indicate components which are powered by the phone line and are thus operational without AC power. Switches, which are outlined by dotted lines in FIG. 10, are assigned the designations "NC" if normally closed, "NO" if normally open or "NDP" if normally in down position. The telephone electronics includes a standard telephone 12-key keypad which provides input to a keyboard/keypad processor and to a telephone dialer. The telephone dialer provides a pulse or tone dialing output to the telephone line. The dialer itself may be selected for either pulse or tone by a switch on the telephone housing or by the software. The telephone dialer may be disconnected from the main telephone line by the primary microprocessor. The direct keypad dialing switch allows the primary microprocessor to remove power from the dialer so that the keypad only provides input to the primary microprocessor. A phone hook switch may be controlled from the primary microprocessor to connect the dialer to the telephone line without raising the handset. A main telephone switch also controlled from the primary microprocessor connects the output of the telephone dialer to the outside telephone line. The direct keypad, dialer telephone hook, and main telephone switch are all controllable from the microprocessor to permit the telephone dialer to provide pulse or tone outputs or deactivate these outputs.

The telephone electronics also includes an off-hook timer activated by lifting of the handset. The off-hook timer is set to expire at the end of a period designated off-hook timer expiration (OHTE). The telephone will go into a manual mode unless the timer is reset by the microprocessor within the OHTE period. The manual mode is activated through the telephone relay disable which is activated by outputs from the off-hook timer and the primary microprocessor. The telephone electronics includes a keyboard/keypad processor which provides an interface between the 52-key keyboard and 12-key keypad and the primary microprocessor. The alternative embodiment disclosed in FIGS. 3 and 4 uses one or more function keys. In the alternative embodiment, function key input is also provided through the keyboard/keypad processor. The interface circuitry and the primary microprocessor will support up to eight function keys. The keyboard/keypad processor also includes the invention's tone detection circuitry. The tone detection elements sense (1) busy/fast busy, (2) call-waiting, (3) ringing or (4) dial tone and provide these detections as an input to the primary microprocessor through the keyboard/keypad processor. The ring and dial tones are also provided through the speech network to the telephone handset. The primary microprocessor provides a serial input to the modem which can be connected by control from the microprocessor to the main telephone line.

The primary microprocessor and the keyboard/keypad processor have an established joint protocol requiring the primary microprocessor to have input from the keyboard/keypad processor every five seconds. If such input is not received, both processors will be reinitialized.

Figure 11:
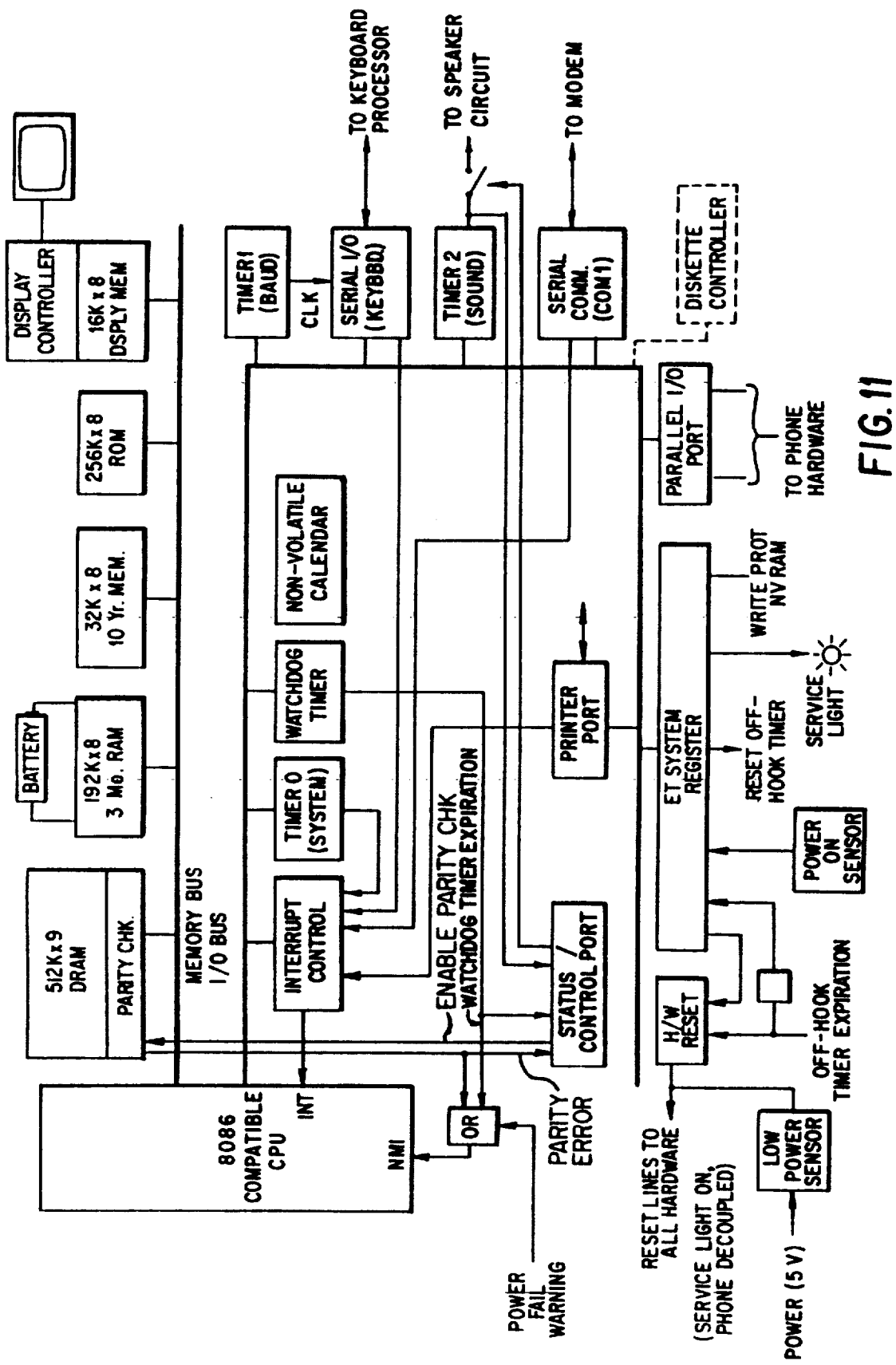
FIG. 11 is a functional diagram of the primary microprocessor of the present invention and its input and outputs.
Figure 12:
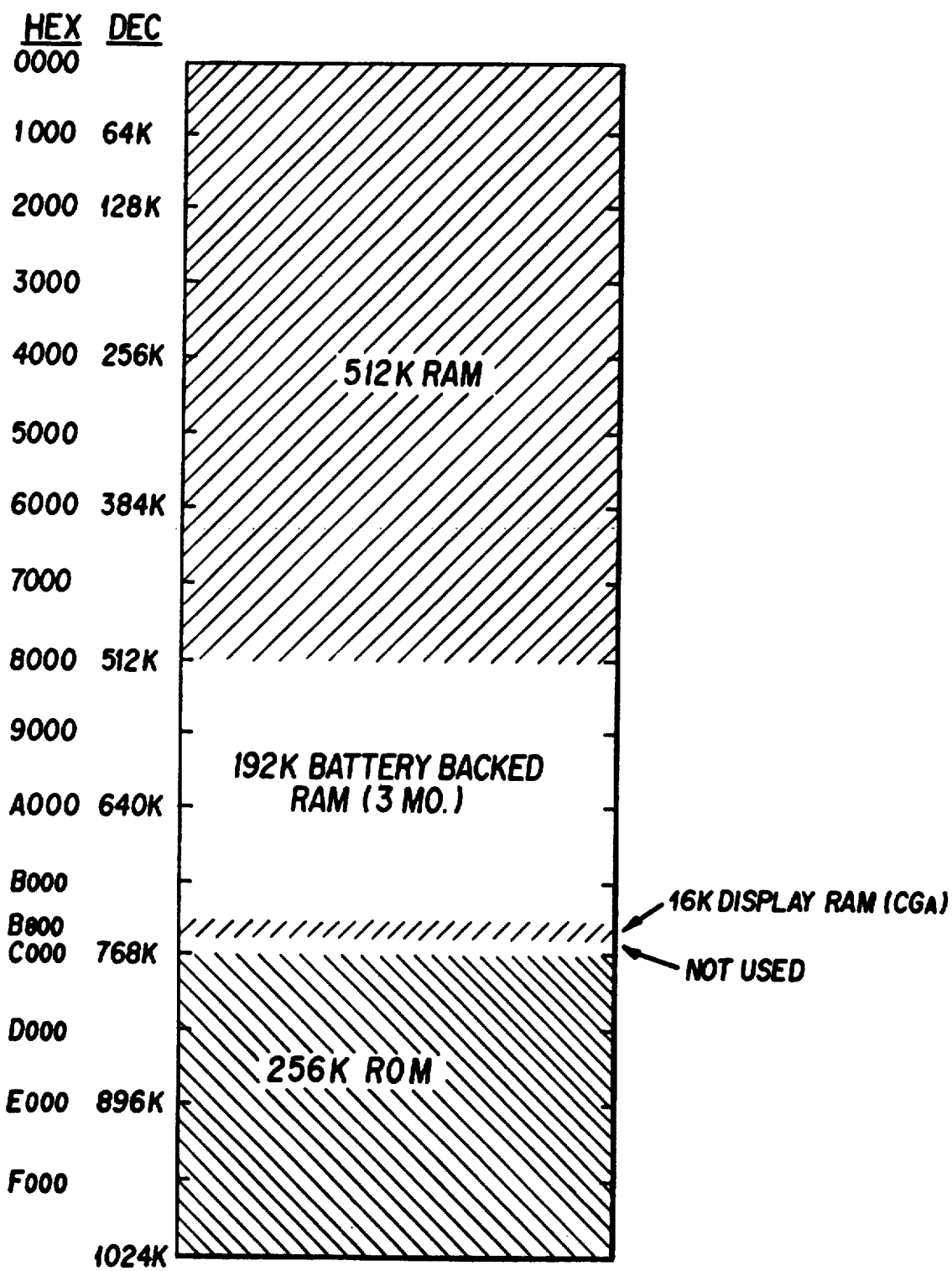
FIG. 12 is a memory map of the memory elements of the primary microprocessor of the present invention.

Referring to FIGS. 9 and 11, the circuitry for the microprocessor includes a number of integrity features which assist in providing a good interface with the telephone operation of the device. The microprocessor includes a watchdog timer which is reset through the microprocessor's Input/Output bus. If, in the period designated watchdog timer expiration (WDTE), the watchdog timer is not reset by the primary microprocessor, a nonmaskable interrupt (NMI) is generated as an input to the microprocessor. If the timer is allowed to expire a second time, a hardware reset is generated which disables the timer and reboots the microprocessor. The telephone hardware then decouples the telephone from the microprocessor and activates a service light on the housing unit. The Central Processing Unit (CPU) of the microprocessor has both a memory bus and an input/output bus. The volatile writable 512K byte RAM memory includes a parity check enabled through a status control port providing a parity error check for the device. The parity error detector provides the same type of NMI and failure protection as the watchdog timer. The microprocessor circuitry detects a critical region of power loss and inputs that detection to the microprocessor. The microprocessor program responds to these inputs in the manner explained above.

The 12-key telephone keypad includes a novel split pill output element which provides two separate output signals. One output is directed to the keyboard/keypad processor and the other to the telephone dialer. The dual output is always provided. The telephone dialer function is deactivated through the direct keypad dialing switch if the processor determines that the output at the keypad should only be directed to the microprocessor and is not a part of the device's normal telephone dialing features.

DESCRIPTION OF OPERATION OF PREFERRED EMBODIMENT

The microprocessor of this invention may be operated as a normal microprocessor device which receives program input through the QWERTY keyboard and the keypad or through a modem. The volatile writable memory of the microprocessor may receive the application programs which may be processed through an application interpreter which is included as a portion of the non-volatile non-writable ROM memory. The microprocessor has a number of predetermined telephone interface features. However, the device includes significant writable memory which can receive input either from the keyboard or through the modem. Once the device has loaded its application memory, it may be operated in most modes using the 12-key telephone keypad. In the alternative embodiment, the device can be operated in most models through a service function key and the 12-key keypad.

In the preferred embodiment, one key of the 12-key keypad is a HELLO button which initiates a menu on the CRT display and provides a guide to the user for subsequent manipulation of the microprocessor. In the alternative embodiment, a service function key performs this function. In either environment, the device presents a user friendly appearance since it has the general appearance and configuration of a standard telephone familiar to most non-technical persons. The device requires no sophisticated knowledge of computer programming or computer operation. The user merely responds to direct guidance from the menu and subsequent pages of instructions which appear on the screen of the CRT.

Figure 13:
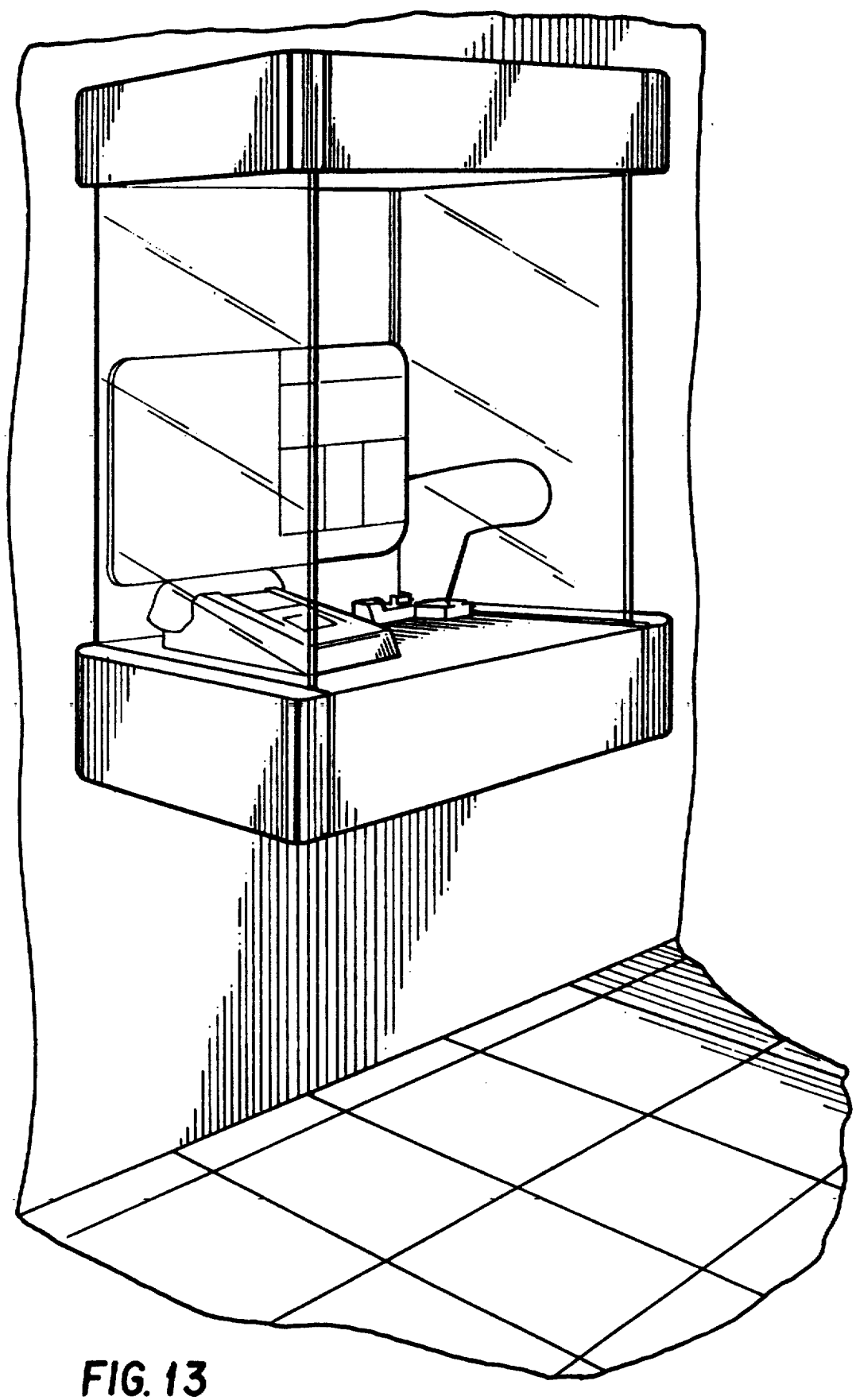
FIGS. 13 and 14 are perspective and plan views of the invention as used in a public booth deployed with peripheral equipment.
Figure 14:
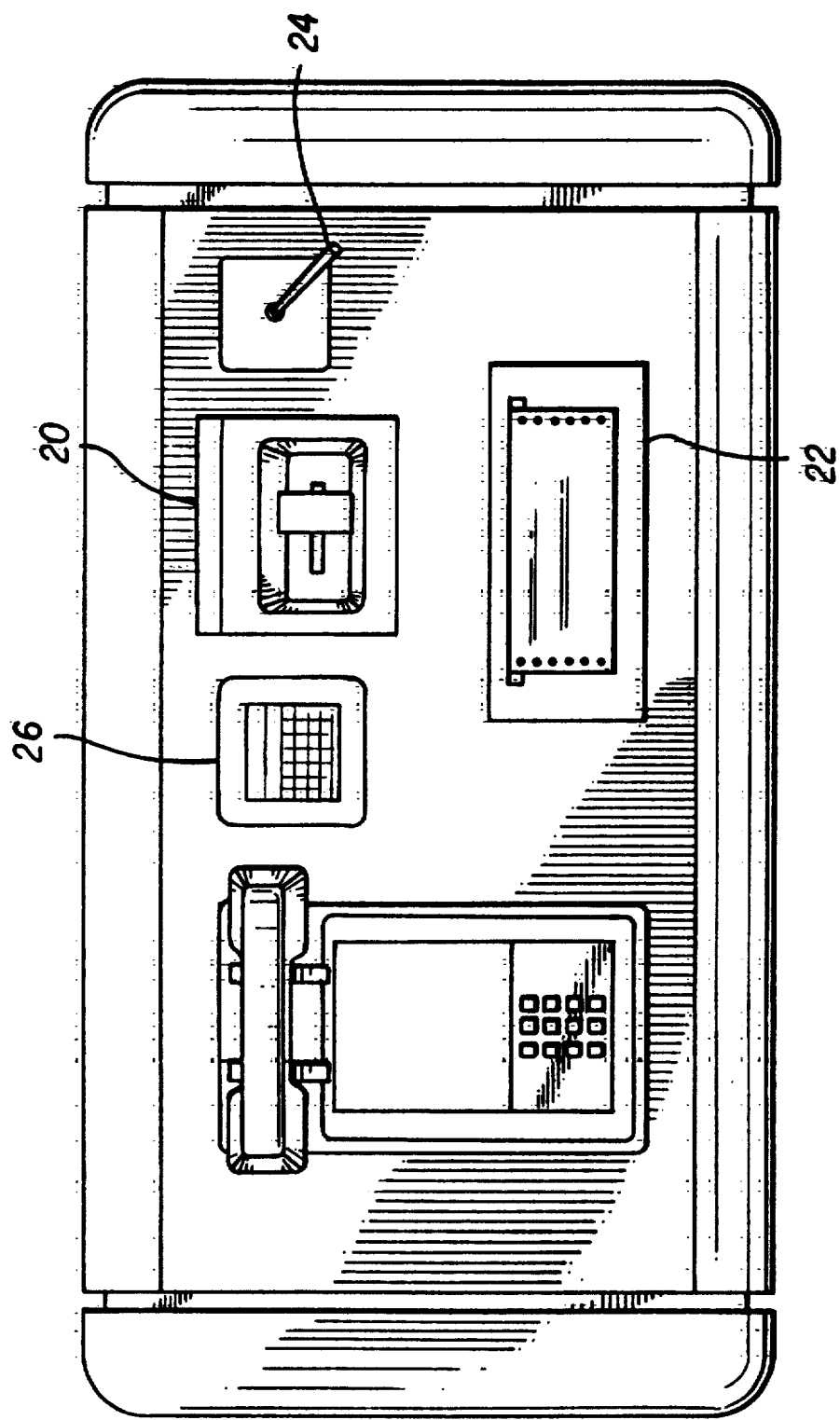

The device may be operated at a public booth as shown in FIGS. 13 and 14. In this configuration, the apparatus of the invention is placed in a form fitted hole in a counter top with only the upper housing visible. The device is deployed with several peripheral items in close proximity in a user-friendly arrangement. The peripheral items which are connected to the apparatus of the invention as shown in FIG. 14, include a card reader 20 for reading magnetic information imprinted on cards, a printer 22 capable of printing transaction journals, a pen 24 and a calculator 26. Other items connected to the apparatus in this configuration, but which are not user-visible, are (1) an attachment called an expansion box for converting signals coming out of the connector on the back of the apparatus, allowing for card reader and printer connection, (2) two floppy disc drives for expanded software and (3) an external power supply to drive the card reader and disc drives.

While specific embodiments of the invention have been disclosed with particularity, it is understood that those skilled in the art may make variations, changes or modifications thereto without departing from the spirit or scope of our invention.

What we claim is:

1. A microcomputer with simplified user interface including a microprocessor computing unit and associated memory;

said microprocessor computing unit responsive to data inputs from an auxiliary processor and instructions maintained in said memory and received through a modem to perform computing and control functions, said microprocessor computing unit and said memory mounted in a housing configured as a conventional telephone unit, said housing having a upper mounting structure and a base structure, a telephone handset mounted in a cradle on said upper mounting structure, a standard twelve-key telephone keypad mounted on said upper mounting structure and a keyboard input device mounted in concealed position within said base structure and movable to an open position for use by the operator of the microcomputer;

said housing also incorporating telephone electronics for standard telephone functioning, including a telephone dialer, speech network and a frequency and ring detectors, said telephone electronics capable of being powered from standard telephone line power;

switch means for providing telephone line power to said telephone electronics for standard telephone functioning in the absence of power to or input from the microprocessor computing unit and memory;

a lapse timer reset by output from said microprocessor computing unit, said lapse timer means providing an interrupt to said microprocessor computing unit unless reset by said microprocessor computing unit within a first predetermined time interval, said microprocessor computing unit being rebooted and removing power from said telephone electronics and said lapse timer means being disabled unless said lapse timer means is reset with a second predetermined time interval; and off-hook detector means for detecting an off-hook condition of said telephone handset mounted on said upper mounting structure, off-hook timer means responsive to said off-hook detector means and said microprocessor computing unit to reboot said microprocessor computing unit and remove power from said telephone electronics unless said off-hook timer is not reset by said microprocessor computing unit within a third predetermined time interval.

2. A microcomputer as claimed in claim 1 which further includes a parity check means for at least a part of the associated memory of the microprocessor computing unit of said microprocessor and logic means responsive to said parity check means to provide an interrupt to said microprocessor computing unit when said parity check means provides an error detection.

3. A microcomputer as claimed in claim 1 further including a dual output device for conventional twelve-key telephone keypad of said microcomputer for providing simultaneous outputs to the telephone dialer of said microcomputer and the microprocessor computing unit through a dual output element mounted below said keypad.

4. A microcomputer as claimed in claim 1 wherein the microprocessor computing unit of said microcomputer is responsive to inputs provided from the telephone electronics and provides control of said telephone electronics, the associated memory of said microprocessor computing unit incorporating both volatile and non-volatile elements so that said microprocessor computing unit and memory may be programmed as a general purpose computer, said memory including a removable memory element configured for permanent data storage even when removed from said microcomputer.

* * * * *